(12) United States Patent
Parikka et al.

(10) Patent No.: US 10,620,360 B2
(45) Date of Patent: Apr. 14, 2020

(54) LIGHT GUIDE WITH PLURALITY OF LIGHT CHANNELS

(71) Applicant: NANOCOMP OY LTD, Lehmo (FI)

(72) Inventors: Marko Parikka, Salo (FI); Marko Honkanen, Lehmo (FI)

(73) Assignee: NANOCOMP OY LTD, Lehmo (FI)

( * ) Notice: Subject to any disclaimer, the term of this patent is extended or adjusted under 35 U.S.C. 154(b) by 0 days.

(21) Appl. No.: 16/076,485

(22) PCT Filed: Feb. 9, 2016

(86) PCT No.: PCT/FI2016/050081
§ 371 (c)(1),
(2) Date: Aug. 8, 2018

(87) PCT Pub. No.: WO2017/137653
PCT Pub. Date: Aug. 17, 2017

(65) Prior Publication Data
US 2019/0051254 A1     Feb. 14, 2019

(51) Int. Cl.
*F21V 8/00* (2006.01)
*B29D 11/00* (2006.01)
*G02F 1/13357* (2006.01)

(52) U.S. Cl.
CPC ............ *G02B 6/0028* (2013.01); *B29D 11/00* (2013.01); *B29D 11/00682* (2013.01); *G02B 6/0036* (2013.01); *G02B 6/0038* (2013.01); *G02B 6/0076* (2013.01); *G02B 6/0078* (2013.01);
(Continued)

(58) Field of Classification Search
CPC ............................ G02B 6/0036; G02B 6/0038
See application file for complete search history.

(56) References Cited

U.S. PATENT DOCUMENTS

2007/0200975 A1* 8/2007 Kamijima ............. G02F 1/1303
  349/95
2008/0030650 A1 2/2008 Kitagawa et al.
2008/0297894 A1 12/2008 Kim et al.
(Continued)

FOREIGN PATENT DOCUMENTS

CN    101852946 A    10/2010
CN    102109633 A     6/2011
(Continued)

OTHER PUBLICATIONS

International Search Report for PCT/FI2016/050081, Completed by the Finnish Patent Office dated Jun. 2, 2016, 7 Pages.
(Continued)

*Primary Examiner* — Omar R Rojas
(74) *Attorney, Agent, or Firm* — Brooks Kushman P. C.

(57) ABSTRACT

A light guide having a light guide body plate having a plurality of elongated light channels extending substantially parallel to each other; the light guide having an out-coupling arrangement for coupling light propagating in the light channels out of the light guide body plate through the first and/or the second main surface. In a horizontal transverse direction, each light channel is confined between two confining stripes formed of a solid confining material having a second refractive index lower than the first refractive index, confining stripes between two adjacent light channels having a height less than the thickness of the light guide body plate.

11 Claims, 4 Drawing Sheets

(52) U.S. Cl.
CPC .. *G02F 1/133615* (2013.01); *G02F 1/133621* (2013.01); *G02B 6/0031* (2013.01)

(56) References Cited

U.S. PATENT DOCUMENTS

| | | |
|---|---|---|
| 2010/0214281 A1 | 8/2010 | Ueno et al. |
| 2010/0253696 A1* | 10/2010 | Choi .................. G09G 3/3426 345/589 |
| 2010/0253882 A1 | 10/2010 | Han et al. |
| 2011/0013421 A1 | 1/2011 | Um |
| 2012/0170314 A1* | 7/2012 | Chang .................. G02B 6/0068 362/613 |
| 2012/0262940 A1 | 10/2012 | Miyairi et al. |
| 2013/0300716 A1* | 11/2013 | Craven-Bartle ...... G06F 3/0421 345/175 |
| 2016/0083573 A1* | 3/2016 | Berdin .................. C08L 77/00 252/511 |

FOREIGN PATENT DOCUMENTS

| | | |
|---|---|---|
| EP | 1988331 | 11/2008 |
| JP | 2006106361 | 4/2006 |
| WO | 2012097004 | 7/2012 |

OTHER PUBLICATIONS

Laurence W. McKeen, "10.6. Polyacrylics" In: "Film properties of plastics and elastomers", Jan. 1, 2012, (Jan. 1, 2012), Elsevier, William Andrew, NL, XP55619638, ISBN: 978-1-4557-2551-9 pp. 237-244, DOI: 10.1016/B978-1-4557-2551-9.00010-4.
European Search Report, dated Sep. 17, 2019. 9 pages.
Chinese patent application 2016800814242 Office Action dated Aug. 30, 2019 with English translation, 17 pages.

* cited by examiner

LIGHT GUIDE WITH PLURALITY OF LIGHT CHANNELS

CROSS-REFERENCE TO RELATED APPLICATION

This application is the U.S. national phase of PCT Application No, PCT/FI2016/050081 filed on Feb. 09, 2016, the disclosure of which is incorporated in its entirety by reference herein.

FIELD OF THE INVENTION

The present invention relates generally to light guides, in particular to light guides suitable for edge-lit backlight configurations for Liquid Crystal Displays (LCD).

BACKGROUND OF THE INVENTION

In LCDs, as in various types of displays in general, the contrast performance of the display is one of the key features affecting the user experience of the display. Primarily, contrast refers to the emitted intensity difference between bright and dark pixels or regions of the display. Typically, especially the darkness of the pixels or regions desired to represent black should emit as low light as possible. The term high dynamic range HDR is often used to refer to a display's functionality related to extremely high difference between the maximum and minimum brightness of the pixels or regions of the display.

In an LCD, the intensity of the light emitted by a pixel or region is generally determined by the backlight illumination intensity and the transmittance of the liquid crystal (LC) module at that pixel/region.

Conventionally, backlight arrangements with substantially uniform illumination intensity at the LC module have been used. Then, the contrast performance of the display panel is determined solely by the adjustability of the transmittance through the LC module. In practice, the LC modules never achieve complete opacity, so with uniform backlight intensity, the deepest dark achievable is always somewhat greyish.

In direct-lit backlight configurations where the light sources, typically LEDs, are located behind or below the LC module, attempts to relieve the above problem have been made based on spatially non-uniform control of the illuminating LED array producing the backlight illumination. In such configurations, the LED panel is divided into sections, the LEDs of which are controlled separately from the other sections. Then, LEDs of the sections illuminating dark or dim regions of the image to be displayed may be controlled so as to emit less or no light, whereas LEDs of the sections corresponding brighter regions of the image are controlled to emit more light. Thereby, the dynamic range of the display can be increased to some extent.

There are many applications, such as various types of mobile devices, where the device configuration with typically relatively low thickness does not allow the use of a direct-lit backlight arrangement, or at least would benefit from the use of an edge-lit backlight configuration. On the other hand, the spatial brightness control by means of separate control of LED segments may be insufficient in some applications. Even with only one LED in one segment, the area of the LC panel illuminated by a single segment may be undesirable large.

SUMMARY OF THE INVENTION

In a first aspect, a light guide plate may be implemented which may be characterized by what is specified in claim 1.

Such light guide comprises a light guide body plate having a first main surface and a substantially parallel second main surface opposite to the first main surface and separated therefrom in a vertical direction by a thickness of the light guide body.

"Light guide" refers to an optical element suitable and designed for guiding light therein, i.e. within the light guide.

The "plate" refers to a generally plate-like structure of the light guide body plate, i.e. a structure extending two-dimensionally in a horizontal direction and having a thickness in the vertical direction substantially lower than the horizontal dimensions.

The "first" and the "second main surfaces" of the light guide body plate, opposite to each other and defining the thickness of the light guide body, could be regarded as, for example, a lower/bottom and an upper/top surface of the light guide body. However, it is to be noted that such references to upwards and downwards directions or upper or lower positions, as well as to "horizontal" and "vertical", shall be understood as defined relative to coordinates fixed to the light guide body plate itself so that the first main surface is the "upper" main surface, and the second main surface is the "lower" main surface. In coordinates fixed to the direction of the gravity of Earth, for example, those surfaces may naturally lie in any direction, depending on the position of the light guide plate.

Thus, the terms "vertical" and the "horizontal" shall be understood as auxiliary definitions not fixed relative to horizontal and vertical directions in the coordinates fixed relative to the gravity of Earth, or any other external coordinates.

The light guide body plate is made of a light guide material having a first refractive index, and comprises a plurality of elongated light channels extending substantially parallel to each other and to the first and the second main surfaces. Extending parallel to the first and the second main surfaces separated in a vertical direction means that the light channels extend in a "horizontal" direction, i.e. "horizontally", using the directional definitions in the above coordinates fixed to the light guide body plate itself. The elongated nature of the light channels means that the light channels have a length and a longitudinal direction.

The plurality of light channels may comprise two or more light channels.

The light guide further comprises an out-coupling arrangement for coupling light which propagates in the light channels out of the light guide body plate through the first and/or the second main surface thereof. The light coupled out of the light guide plate may be used for illuminating purposes, for example, for backlight illumination of a liquid crystal (LC) layer or module of a liquid crystal display (LCD). The plurality of light channels enable, for example, implementing segmented illumination of such display layer or module by controlling separately the light transmitted to different light channels.

The light guide material may be any material suitable for light guides for the wavelength range used in the intended application at issue, such as visible wavelengths for the display backlight purposes. Suitable materials include, for example, acryl and polycarbonate.

In a horizontal transverse direction, i.e. in a direction parallel to the first and the second main surfaces and perpendicular to the longitudinal direction of the light channels, each light channel is confined between two confining stripes formed of a solid confining material. The confining material has a second refractive index which is lower than the first refractive index by a refractive index difference which enables total internal reflection at interfaces between the light channels and the confining stripes.

Thus, light propagating in a light channel and being incident on the interface between the light channel and a confining stripe may be reflected by total internal reflection (TIR) back to the light channel, thereby continuing propagation in the light channel. The condition for the refractive index difference at a given wavelength of the light to enable TIR depends on the propagating angle of the light relative to the longitudinal direction of the light channel. As well known, the greater the incident angle relative to the normal of the interface, the smaller refractive index produces TIR. It is of routine engineering for a skilled person to specify the requirements for TIR in a given system.

The confining stripes between two adjacent light channels have a height which is less than the thickness of the light guide body plate so that the light guide body plate forms a continuous structure. Thus, the confining stripes do not completely cut off the light guide plate in the vertical direction but, when observed in a cross-sectional plane of the light channels, there remains a connecting portion of the light guide material between two adjacent light channels.

Many advantageous effects may be achieved by various embodiments of the light guide plate. The fact that the confining stripes are solid structures may allow forming the light guide plate as a rigid body and/or, on the other hand, implementing the light guide body plate so as to have low overall thickness. Further, the confining stripes covering only a part of the thickness of the light guide body plate may allow controlling leakage of light between adjacent light channels, thereby avoiding or relieving dark lines in the out-coupled light between adjacent light channels.

The optimal height of the confining stripes relative to the thickness of the light guide body plate may depend on application. The height of the confining stripes between two adjacent light channels may cover, for example, 50 to 90% of the thickness of the light guide body plate.

A light guide may comprise a first and a second light guide body plate in accordance with those discussed above. The first and the second light guide body plates may be superposed on top of each other with the light channels thereof directed at an angle with relation to each other. This way, a two-dimensional grid of light channels may be implemented which can be used, for example, two-dimensionally segmented backlight illumination of an LCD.

In a light guide with a first and a second light guide body plate, at least part of the confining stripes of at least one of the first and the second light guide body plates may be connected to each other via an attaching layer which attaches together the first and the second light guide bodies. Thus, in this embodiment, the confining material may form a continuous structure extending also outside the confining stripes.

In another embodiment of a light guide enabling a two-dimensional grid of light channels, one single light guide body plate as discussed above comprises, instead of one single plurality of light channels only, a first and a second plurality of light channels in accordance with the plurality of light channels discussed above. The light channels of the first and the second pluralities of light channels are directed at an angle with relation to, and cross with each other. In this embodiment, the confining material is selected to have optical properties which produce, for the maximum width of the confining stripes in the horizontal traverse direction, substantially optically clear confining stripes.

In this embodiment, the two groups of light channels formed in a single light guide body plate are not separated from each other vertically but they physically cross each other at the intersections of the differently directed light channels. At an intersection of two light channels, the two light channels thus combines.

"Optically clear" refers to the optical properties of the light guide material allowing light to propagate in the material without significant absorbance or scattering losses. An optically clear layer may be defined as one producing, with a given layer thickness, transmittance of at least 80% and haze value of 30% at maximum for the relevant wavelength range.

The confining material producing optically clear confining stripes may be, for example, curable, initially liquid substance which can be cured after applying, for example, by ultraviolet (UV) light or heat. Examples of such substances include various optically clear adhesives (OCA), such as liquid optically clear adhesives (LOCA). There are available optically clear materials, i.e. ones capable of forming optically clear layers and structures, based on, for example, acryl and silicone.

In any embodiment having two pluralities of light channels in the light guide body, the light channels of the different pluralities of light channels may be directed, for example, perpendicularly relative to each other.

In the embodiment with the first and the second pluralities of light channels in single light guide body, the refractive index difference between the first and the second refractive indices may be, for example, less than or equal to 0.2, preferably less than or equal to 0.1. Such difference may be appropriate for many common light guide materials typically having their refractive index, i.e. the "first" refractive index in the embodiments above, around 1.5. Such low difference in the refractive index may reduce the effect of the confining stripes of a crossing light channel on the light propagating in a light channel. Together with the height of the confining stripes less than the thickness of the light guide, this may result in relatively low disturbance in passing of light, propagating in a light channel, through an intersection where that light channel crosses another, differently directed light channel.

Although the refractive indices of many commonly used light guide materials lies around 1.5, also other type of materials may be used which have higher or lower refractive indices. Then, the refractive index difference may be scaled accordingly to correspond to the above embodiment.

In any embodiment discussed above, the out-coupling arrangement may comprise any appropriate reflective, refractive, diffractive, and/or scattering optical arrangements or elements configured to couple light propagating in the light channels out of the light guide body plate. The out-coupling arrangement may be implemented as one single, continuous structure or arrangement covering the entire area of the light guide body plate. It may alternatively comprise a plurality of separate out-coupling elements or sub-arrangements.

The out-coupling arrangement may comprise optical micro features capable of changing the direction of light propagating in a light channel. "Optical micro features" generally refer to structural or material features capable of affecting light propagation in the light channel so that the light is at least partially coupled out of the light channel. Optical micro features have at least some characteristic dimension sized in the range of sub-wavelength dimensions to some tens of wavelengths.

In the case of structural features, the optical micro features may have structures or patterns with two different height levels, i.e. binary structures. Alternatively, the optical micro features may have multi-level height variations with a plurality of discrete height levels, or they may have continuously or gradually varying height levels.

In an embodiment, the light coupling arrangement comprises optical micro features positioned horizontally aligned with a light channel, the optical micro features comprising lines oriented perpendicular to the longitudinal direction of the light channel.

The out-coupling arrangement may comprise such optical micro features for each of, or only for some of, the light channels. Different light channel may have own optical micro features separate from the other light channel's optical micro features. Alternatively, two or more light channels may share common optical micro features.

Being "horizontally aligned" refers to location of the optical micro features which overlaps with the light channel when observed in the "vertical" direction, i.e. in a direction perpendicular to the first and the second main surfaces of the light guide body plate. Then, in a plane along which the light channel extends, a fictitious projection or footprint of the optical micro features lies at least partially in the area of the light channel. So located, the optical micro features may effectively couple light propagating in the light channel out of the light guide plate.

In the vertical direction, the out-coupling arrangement in general as well as the optical micro features of the above embodiment may be located as embedded within the light guide body plate(s) or on, or close to, the first and/or the second main surfaces of the light guide body plate(s).

The "lines" may comprise any structural or material linear features which may interact with the light propagating in the light channel so that the light incident on the out-coupling configuration becomes at least partially coupled out of the light channel and further out of the entire light guide body plate through the first and/or the second main surface thereof. The lines may be arranged as an array of adjacent lines.

Being oriented perpendicular to the longitudinal direction of the light channel may make the out-coupling of the light which propagates, on average, along the longitudinal direction of the light channels, efficient. On the other hand, so oriented lines may have only little effect on light propagating substantially along the longitudinal direction of a differently directed light channel crossing the first mentioned light channel.

The out-coupling efficiency of the out-coupling arrangement and the elements, sub-arrangements and/or features thereof may be adjusted to be non-constant. For example, it may vary as function of distance from an edge of the light guide body plate. That way, it is possible, for example, to have out-coupling efficiency which compensates the drop of the light intensity along the increase of the distance from the light source(s) supplying light into the light guide(s).

The confining stripes may have any appropriate cross-sectional shape. In an embodiment, they have a substantially triangular cross-section. Triangular cross-section may provide advantageous effects, for example, manufacturing point of views. In other embodiments, for example, rectangular cross-sectional shapes are possible.

In any of the embodiments above, the light guide may also comprise further layer(s) and/or element(s) in addition to the light guide plate with the light channels and the confining stripes and the out-coupling arrangement. For example, there may be one or more reflecting layers on one of the first and the second main surfaces of the light guide body plate to prevent leaking light out of the light guide to an undesired direction. On the side of the intended illuminating direction, the light guide may comprise, for example, one or more light management layers or films for directing and/or diffusing the light coupled out of the light channels.

In a further embodiment, a complete liquid crystal display assembly may be implemented which comprises a liquid crystal (LC) layer and a light guide in accordance with any of the embodiments discussed above, the light guide being arranged for illuminating the liquid crystal layer.

Being arranged for illuminating the LC layer refers to location and position of the light guide relative to the LC layer so as to enable the LC layer to be illuminated by light emitted from the light guide so that the light may serve for backlight illumination of the LC layer. This may be achieved, for example, by a light guide attached to the display assembly behind or below the LC layer, possibly separated therefrom by some intermediate layer(s).

Light may enter the light guide at the edge(s) of the light guide body plate, i.e. at the end(s) of the light channels. In such configuration, the light guide together with light sources generating the light may operate as an edge-lit backlight arrangement of the display assembly.

In any of the embodiments above, the light guide may comprise any appropriate in-coupling arrangement configured to couple light into the light channels via the ends thereof. Such arrangement may comprise optical elements configured to shape the light beam emitted by the primary light sources, such as light emitting diodes (LED), so that the light enters the light channels in directions enabling the total internal reflectance. The optical elements may comprise, for example, lenses such as Fresnel lenses.

Any of the light guides discussed above may be configured to receive light into a light channel from both ends thereof. Then, the light channel may comprise two halves each guiding light received from one end of the light channel. To implement this, a light channel may comprise, for example, a blocking structure positioned substantially in the middle of the light guide in the longitudinal direction thereof. Such blocking structure, which may comprise e.g. reflector(s), may prevent light, entered the light channel from one end thereof and propagated through the associated half of the light channel, from propagating further to the other half of the light channel.

Instead of, or in addition to, a physical blocking structure, the out-coupling structure may be configured to couple light out of the light channel so that substantially all the light entered into the light channel from one end thereof is coupled out of the light channel from the associated first half thereof.

In any of the light guides discussed above, the thickness of light guide body plate may lie, for example, in the range of 0.2 to 5 mm. One single light channel may have a width, for example, higher than or equal to 2.5 mm. The upper limit depends on, for example, the purpose of the light coupled out of the light guide body plate. For example, for segmented display backlight illuminations, the display size may determine the desired segmentation performance and the maximum light channel width. The number of light channels of a plurality of light channels may vary from two to any appropriate number. In the case of two pluralities of light channels, the two light channels may comprise different numbers of light channels.

In a second aspect, a method for manufacturing a light guide may be carried out which may be characterized by what is specified in claim 10. Thereby, light guides of the first aspect discussed above may be manufactured. What is discussed above concerning the details, ways of implementation, as well as advantages of the light guides of the first aspect apply, mutatis mutandis, also to the method points of view of the second aspect. The same applies vice versa.

The method comprises providing a light guide body plate having a first main surface and a substantially parallel second main surface opposite to the first main surface and separated therefrom in a vertical direction by a thickness of the light guide body plate, the light guide body plate being made of a light guide material having a first refractive index; forming in the light guide body plate a plurality of elongated light channels extending substantially parallel to each other and to the first and the second main surfaces; and forming an out-coupling arrangement for coupling light propagating in the light channels out of the light guide body plate through the first and/or the second main surface.

In the method, forming the plurality of elongated light channels comprises forming a plurality of grooves in the light guide body plate, each light channel being confined, in a horizontal transverse direction, between two grooves, grooves between two adjacent light channels having a height less than the thickness of the light guide body plate so that the light guide body plate forms a continuous structure; and filling the grooves so as to form confining stripes formed of a solid confining material having a second refractive index lower than the first refractive index by a refractive index difference which enables total internal reflection of light at interfaces between the light channel and the confining stripes.

The light guide body plate may be provided, for example, as a continuous, flexible sheet which may be processed in a roll-to-roll process. Then, a plurality of light guide body plates with light channels and out-coupling arrangements may be formed as one single long sheet and cut therefrom afterwards.

The out-coupling arrangement may be formed, for example, by first printing a curable substance, such as a UV-curable (ultraviolet) resin or lacquer, onto the light guide body plate in liquid form, and forming out-coupling structures thereon by printing, simultaneously illuminating the curable agent with UV light. Also substances curable by factors other than UV light, such as heat or a curing agent, may be used.

The out-coupling arrangement may be formed on or near one of the main surfaces of the light body plate. Alternatively, it may be formed as an embedded structure within the interior of the light guide body plate.

The grooves may be formed in the light guide body plate in any appropriate manner. Possible techniques comprise, for example, laser ablation and hot embossing.

In an embodiment, filling the grooves comprises applying a filling agent in a liquid form into the grooves, and curing the filling agent thereby applied into the grooves. The filling agent may comprise, for example, UV-curable lacquer or liquid optically clear adhesive (LOCA).

In another embodiment, the light guide body plate with ready-made grooves may be may formed, for example, by injection molding. Then, the grooves may be filled, for example, by two-component molding afterwards. Alternatively, they may be filled by co-molding in the same process in which the light guide body plate is formed.

When forming the out-coupling arrangement on or near the first or the second main surface of the light guide body plate, it may be preferable, from the manufacturing feasibility point of view, to form the grooves on the opposite surface of the light guide body plate.

The grooves may be formed so as to make the height of the confining stripes between two adjacent light channels cover 50 to 90% of the thickness of the light guide body plate.

In an embodiment, the method comprises manufacturing a first and a second light guide body plate in accordance with any of the methods discussed above, and superposing the first and the second light guide bodies on top of each other with the light channels thereof directed at an angle relative to each other.

The first and the second light guide body plates may be attached to each other by or via an attaching layer. As discussed above with regard to the first aspect, such attaching layer may be formed, for example, of the confining material as a connecting structure connecting together at least part of the confining stripes of at least one of the first and the second light guide body plates. Such attaching layer may be formed, for example, by continuing filling the grooves also after when the grooves are completely filled, until the filling agent forms a continuous layer.

In an alternative method for manufacturing a light guide with two pluralities of light channels, a first and a second plurality of light channels are formed in the light guide body plate in accordance with the basic method discussed above, the light channels of the first and the second plurality of light channels being directed at an angle with relation to, and crossing with each other. In this embodiment, the confining stripes are formed so as to have a maximum width in the horizontal transverse direction, the confining material being selected to produce, for the maximum width of the confining stripes, optically clear confining stripes.

In any of the embodiments where two pluralities of light channels are formed in the light guide body, the light channels of the different pluralities of light channels may be directed, for example, perpendicularly relative to each other.

In an embodiment where the first and the second pluralities of light channels are formed in the single light guide body, the refractive index difference is less than or equal to 0.2, preferably less than or equal to 0.1. This may be achieved by appropriate selection of the light guide material and the confining material.

In any method discussed above, forming the out-coupling arrangement may comprise forming optical micro features positioned horizontally aligned with a light channel, the optical micro features comprising lines oriented perpendicular to the longitudinal direction of the light channel.

In any method discussed above, the grooves may be formed so as to have a substantially triangular cross-section or, for example, a substantially rectangular cross-section.

In a further embodiment, a method may be carried out for forming or manufacturing a liquid crystal display assembly, the method comprising manufacturing a light guide in accordance with any of the methods discussed above; providing a liquid crystal layer; and assembling the light guide and the liquid crystal layer into a display assembly.

The steps of the methods discussed above may be carried out in any appropriate order, and two or more of the steps may be carried at least partially overlapping in time.

BRIEF DESCRIPTION OF THE DRAWINGS

In the following, the present invention is described with reference to the accompanying drawings, wherein.

The drawings in the Figures are schematic and not in scale.

DETAILED DESCRIPTION OF THE EMBODIMENTS

Figure 1:
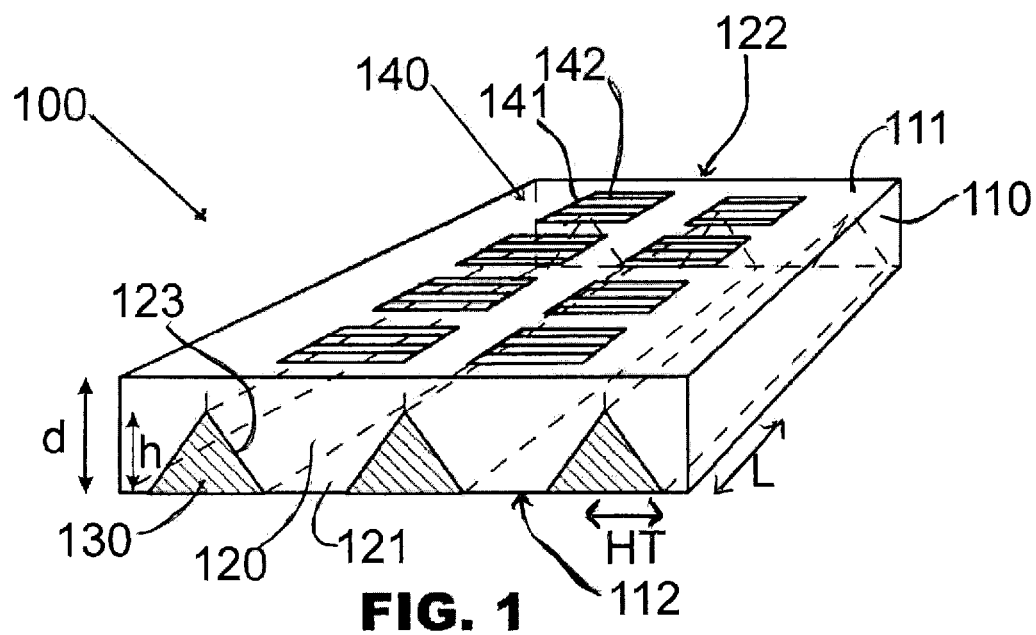
FIGS. 1-3 show embodiments of a light guide.

The light guide 100 of FIG. 1 is implemented as a planar, generally plate-like structure. It comprises a light guide body plate 110 having a first or upper main surface 111 and a second or lower main surface 112. When observed in fictitious observation coordinates fixed to the light guide body plate, the opposite main surfaces extend horizontally and are separated in the vertical direction. The upper and the lower main surfaces of the light guide body plate define a thickness d of the light guide body plate in the vertical direction.

The drawing of FIG. 1 can present a complete light guide body plate or a part of a larger light guide body plate. Hereinafter, both alternatives are referred to by the "light guide body plate" 110.

The light guide body plate 110 comprises two adjacent light channels 120 or segments extending parallel to each other and to the main surfaces of the light guide plate.

Each light channel extends as an elongated structure, having a first end 121 and a second end 122, through the light guide body plate 120. Each light channel is confined or limited in a horizontal transverse direction HT, i.e. in a direction parallel to the main surfaces of the light guide body plate and perpendicular to the longitudinal direction L of the light channels, between two confining stripes 130. Between the adjacent two light channels, there is only one confining stripe in the example of FIG. 1, shared by the two light channels. So, in the light guide body plate 110 of FIG. 1, there are three confining stripes.

In FIG. 1, the confining stripes 130 are illustrated with their bottom surfaces coinciding with, i.e. lying at the same level with the lower main surface 112 of the light guide body plate. Alternatively, the confining stripes may extend below the lower main surface 112 of the light guide body plate so that the material thereof forms a continuous layer on that surface, connecting together the adjacent confining stripes.

The light guide body plate 110 is formed of a transparent and optically clear material suitable for light guides, such as acryl or polycarbonate, having a first refractive index. Here, "optically clear" refers to optical properties of the light guide body plate material(s) producing, in the relevant wavelength range, optical clarity for the maximum length of the light channels in the longitudinal direction thereof.

The confining stripes 130 are formed of a solid confining material which has a second refractive index which is lower than the first refractive index of the light guide body plate. This allows light to propagate in the light channels via total internal reflections (TIR) at the interfaces 123 between the light channels 120 and the confining stripes 130.

The confining stripe 130 between the two light channels, as well as all other confining stripes of FIG. 1, has a height h which is less than the thickness d of the light guide plate. The height can cover 50 to 90%, for example, about 70 or 80%, of said thickness. The light guide plate is thus not completely cut off into separate segments or sections by the confining stripes. Instead, the light channels are connected to each other, forming one single continuous light guide body plate structure.

Said non-complete coverage of the height of the confining stripes 130 of the light guide body plate thickness results in that light propagating in a light channel 120 may partially leak to the adjacent light channel(s). This may provide advantages in that, when the light guide 100 is used for backlight illumination of a display, there will be no dark or dimmed lines in the illumination corresponding to the locations of the confining stripes.

At or close to the first main surface 111, the light guide comprise an out-coupling structure 140 configured to couple light which propagates in the light channels out of the light guide body plate through the first or the second main surface thereof.

In the example of FIG. 1, the out-coupling arrangement comprises coupling elements 141, each comprising optical micro features formed as lines 142 oriented perpendicularly to the longitudinal direction of the light channels. Perpendicular orientation may provide efficient coupling of the light propagating, on average, along the longitudinal direction of the light channels.

The lines may be, for example, reflective, refractive, diffractive or scattering features. The coupling elements and the optical micro features thereof lie aligned with the light channels in the vertical direction, i.e. "above" the light channels.

Instead of, or in addition to, lines or linear micro features, coupling elements could comprise other types of optical micro features capable of coupling light out of the light channels.

Instead of, or in addition to, discrete coupling elements, an out-coupling arrangement could be formed as one single continuous coupling arrangement.

Figure 2:
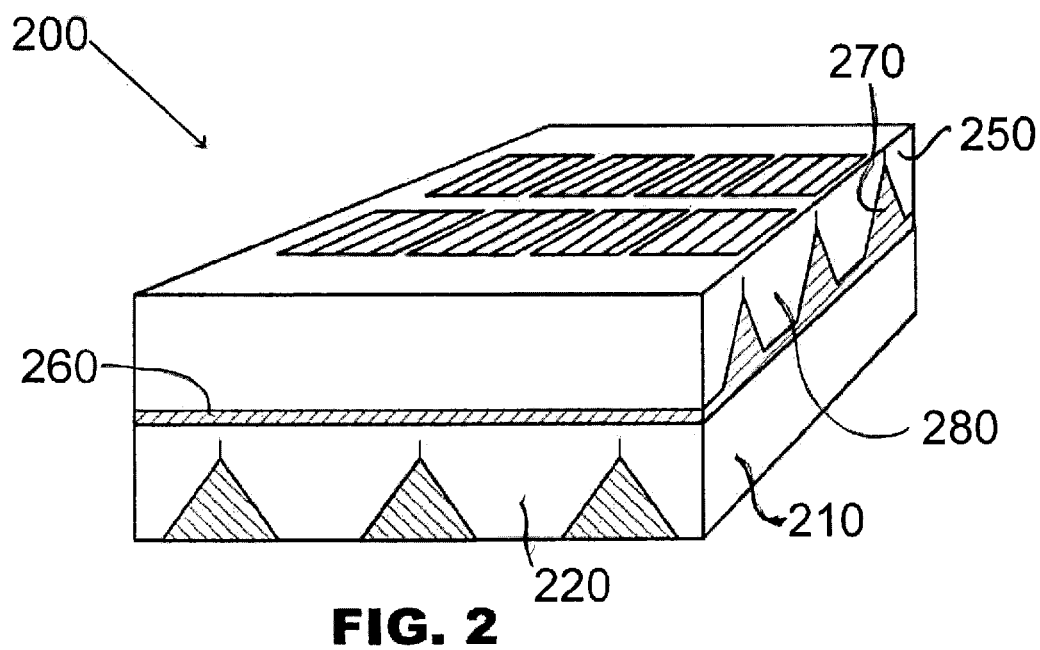

The light guide 200 of FIG. 2 comprises, in addition to a first light guide body plate 210 which may be in accordance with any of the light guide bodies discussed above with reference to FIG. 1, a second light guide body plate 250. The second light guide body plate 250 may also be basically in accordance with any of the light guide body variations discussed above with reference to FIG. 1, differing therefrom by an attaching layer 260.

The attaching layer 260 is formed of the confining material of which the confining stripes 270 of the second light guide body plate 250 are formed. The confining stripes 270 of the second light guide body plate are connected via the attaching layer so that the attaching layer and those confining stripes form an integral, continuous structure.

The first and the second light guide body plates 110, 250 are attached to each other by or via the attaching layer 260.

The light channels 220, 280 of the first and the second light guide body plates are directed perpendicularly relative to each other. In other embodiments, also other angles between the light channels 220, 280 of the first and the second light guide body plates are possible.

In an alternative embodiment, instead of being located on the bottom side of the first light guide body plate as illustrated in FIG. 2, the confining stripes of the first light guide body plate may lie on the top side, i.e. adjacent to the upper main surface, of the first light guide body plate. Then, the confining stripes of the first and the second light guide body plates and the attaching layer may form one single continuous structure formed of the confining material.

Such continuous structure may be manufactured, for example, by first applying confining/attaching layer material, such as some type of OCA, on the upper main surface of the first light guide body plate having the grooves thereon. The second light guide body plate may then be placed on and pressed against the first light guide body plate, with the main surface of it having the grooves thereon facing towards the first light guide body plate. Thereby, the confining material may be squeezed to the grooves of the first and the second light guide body plate, and the excess material remaining between the light guide body plates may form the attaching layer. When using as the confining stripe/attaching layer material a substance which is initially in liquid form, such as a LOCA, the grooves of the first light guide body plate may be filled already when applying such substance on the first light guide body plate.

Figure 3:
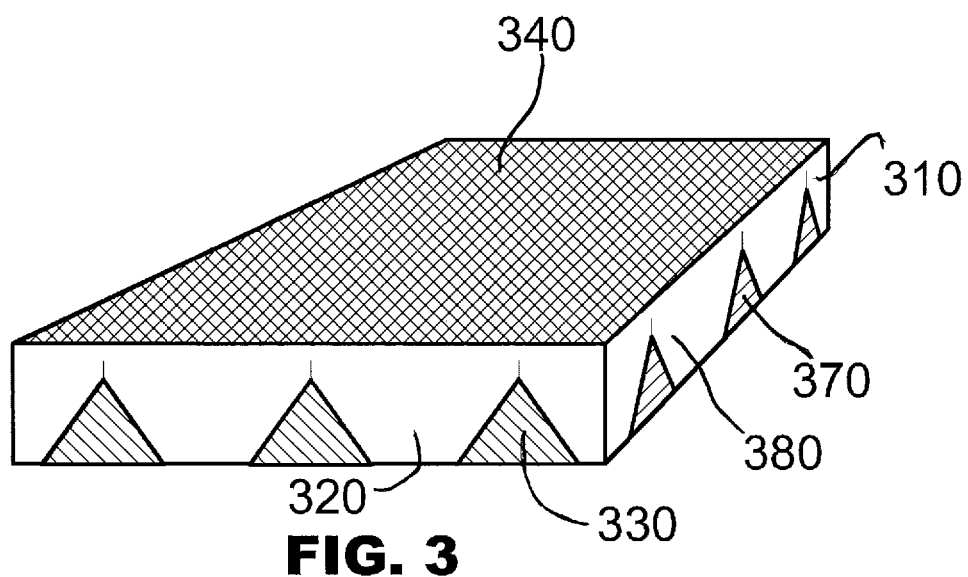

The light guide 300 of FIG. 3 differs from those discussed above with reference to FIG. 1 in that it comprises first light channels 320 and second light channels 380 in the single light guide body plate 310.

The first and the second pluralities of light channels 320, 380 of the light guide 300 of FIG. 3 are directed perpendicularly to each other. They lie substantially aligned in the vertical direction so that the first and the second light channels coincide, i.e. cross each other at the intersections thereof.

The confining stripes 330, 370 of the first and the second pluralities of light channels 320, 380 are made of a confining material which is substantially optically clear so that the confining stripes are, for the maximum width of the confining stripes, optically clear at the visible wavelength range, i.e. the wavelength range from about 400 to about 800 nm.

The refractive index difference between the first and the second refractive indices may be, for example, less than or equal to 0.2 or less than or equal to 0.1. With sufficiently low difference, the disturbance a confining stripe causes for the propagation of light along a light channel perpendicular to that confining stripe may remain low.

The light guide 300 of FIG. 3 comprises an out-coupling arrangement 340 on the first main surface of the light guide boy plate 310, which arrangement may comprise optical micro features of any appropriate type for coupling light propagating in the first and the second light channels out of the light guide body plate.

Figure 4:
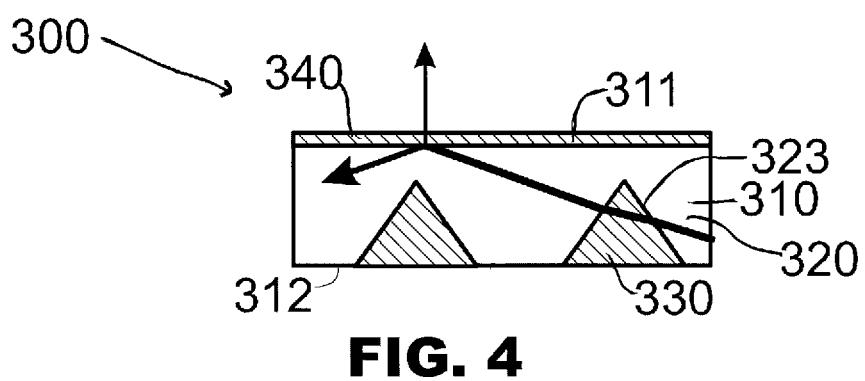
FIG. 4 illustrates the operation of a light guides.

FIG. 4 illustrates the operation of the light guide of FIG. 3. Light, marked in the drawing by an arrow, propagates in a light channels oriented along the cross-sectional plane shown in the drawing. When incident on the interface 323 between a light channel 320 and an intersecting confining stripe 330, the light is mainly refracted slightly and entered the confining stripe. At the opposite side surface of the same confining stripe, the light is again refracted as defined by the initial propagation direction and the directions of the side surfaces of the confining stripes.

When the light is incident on the first main surface 311 of the light guide body plate, part of it is coupled by the out-coupling arrangement 340 out of the light guide plate through the first main surface thereof.

At the second main surface 312, the light guide body plate 310 may comprise, for example, a reflective layer preventing light from escaping the light channels through that surface.

In the examples of FIGS. 1 to 4, the confining stripes are formed as having a substantially triangular cross-section. Any other appropriate cross-sectional shape is alternatively possible also. As one example, in the display assembly 501 of FIG. 5, the confining stripes 530 have a substantially rectangular cross-sectional shape.

Figure 5:
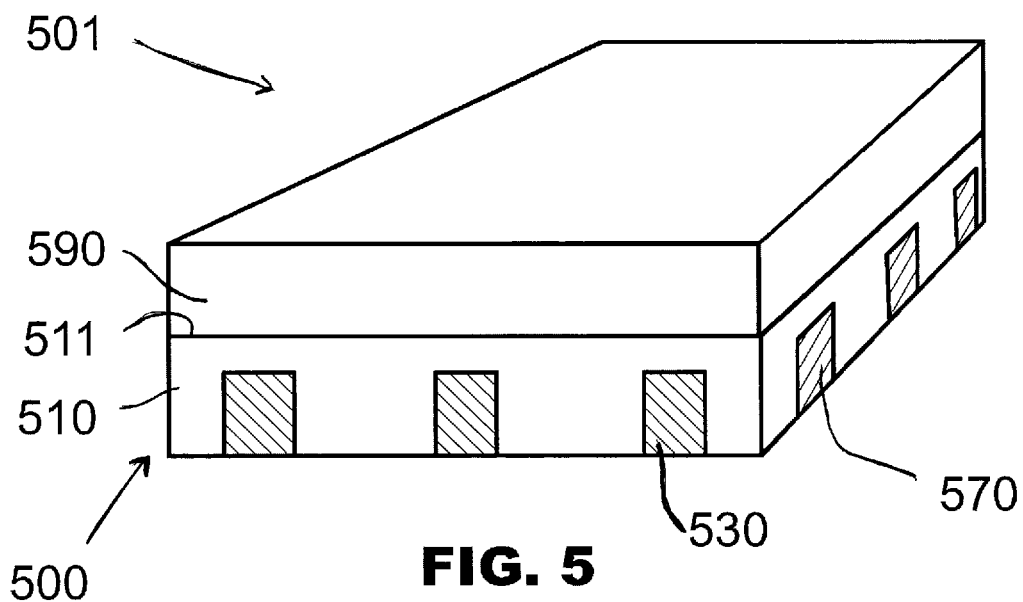
FIG. 5 illustrate a display assembly.

FIG. 5 shows a display assembly 501 comprising, in addition to a light guide 500 generally in accordance with any of those embodiments discussed above with reference to FIGS. 3 and 4 (except of the cross-sectional shape of the confining stripes 530, 570), a liquid crystal (LC) layer 590 attached on the first main surface 511 of the light guide body plate 510. Light coupled out of the light guide 500 through the first main surface 511 of the light guide body plate 510 serves for backlight illumination of the liquid crystal layer 590.

Instead of a light guide generally in accordance with the embodiments discussed above with reference to FIGS. 3 and 4, in other embodiments, display assemblies may be implemented having light guides generally in accordance with any of the light guide embodiments discussed above.

Figure 6:
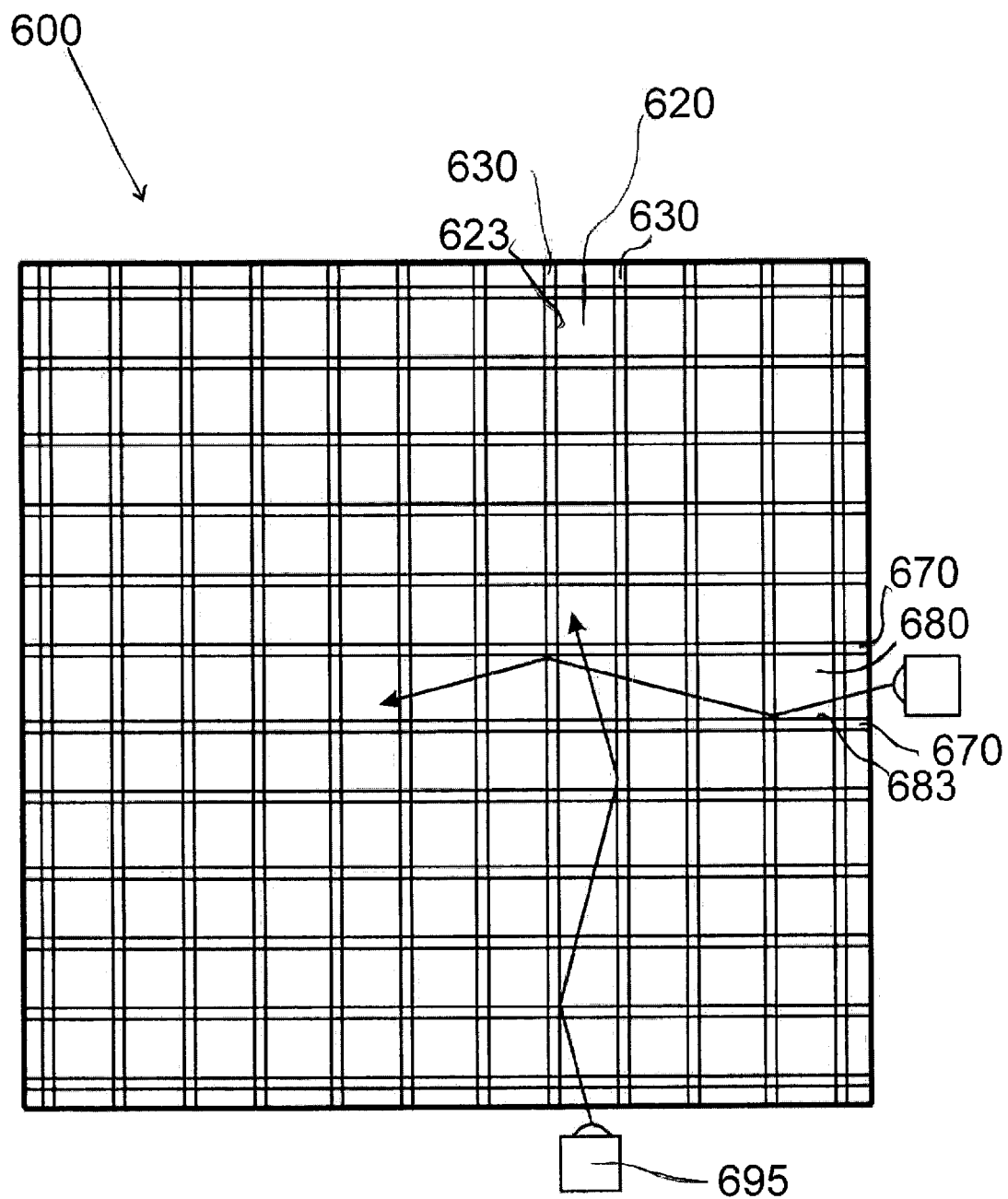
FIG. 6 illustrates the operation of a light guide.
Figure 7A:
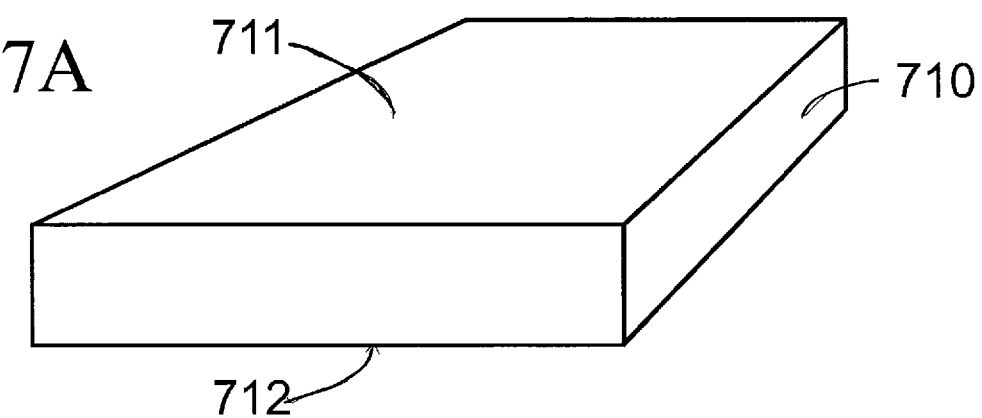
FIGS. 7a, 7b, 7c and 7d illustrates a method for manufacturing a light guide.
Figure 7B:
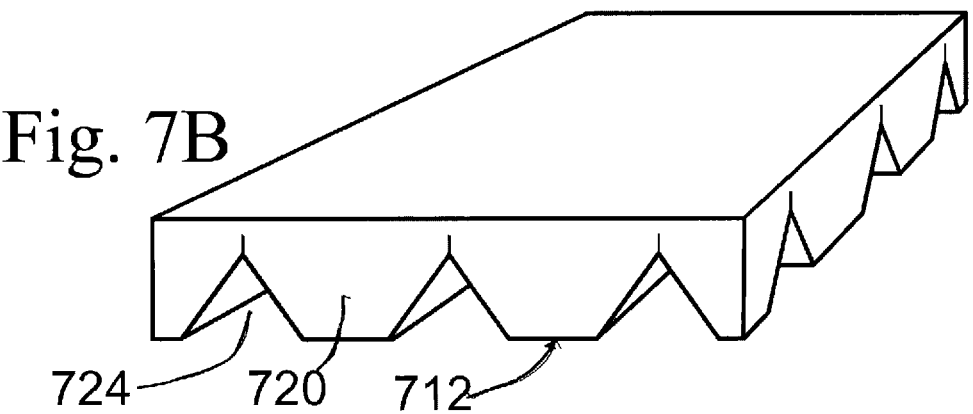
Figure 7C:
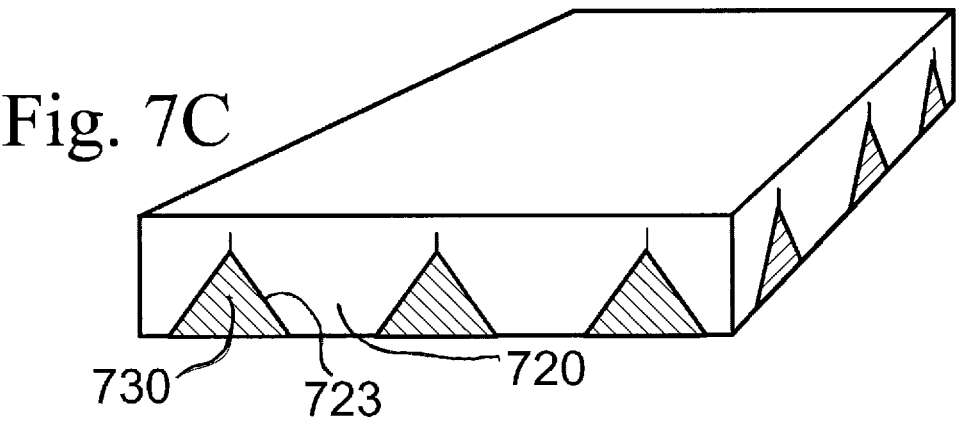
Figure 7D:
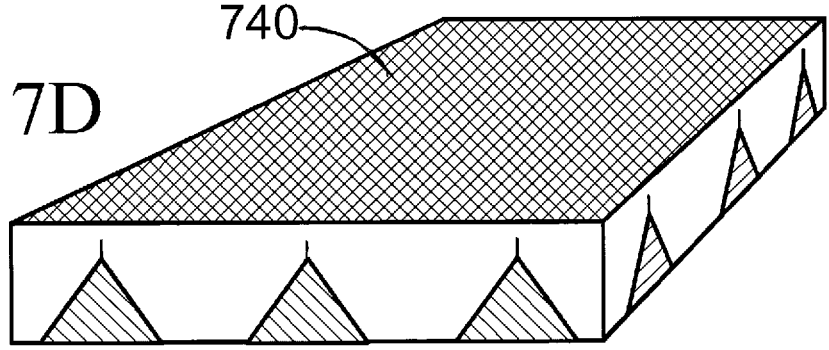

The top/bottom exploded view of FIG. 6 of a light guide 600 illustrates the propagation of light in the light guide. The light guide 600 may be in accordance with any of the light guide embodiments discussed above having two pluralities of light channels 620, 680 confined between confining stripes 630, 670.

Light is emitted into the differently oriented light channels 620, 680 from light emitting diodes 695, possible equipped with beam shaping optics. Beam shaping optics may also be arranged at the ends of the light channels itself.

In each light channel 620, 680, light propagates via TIR at the side interfaces 623, 683 between the light channel and the confining stripes 630, 670 confining it. TIR may also occur at the upper and/or lower main surfaces of the light guide body plate. An out-coupling arrangement (not illustrated in the drawing) may couple part of the light out of the light guide body plate on each interaction of the light with the out-coupling arrangement. Due to the low disturbance caused by the intersecting confining stripes on the propagation of light in a light channel, the differently oriented light channels may operate substantially independently from each other.

The method of FIG. 7 starts by providing a light guide body plate 710, as illustrated in drawing A. The light guide body plate may be a discrete single light guide body plate. Alternatively, although illustrated in FIG. 7 as a single light guide body plate, the light guide body plate may be an integral part of a larger preform for from which a plurality of light body plates may be separated later. In both cases, the light guide body plate may be formed, for example, as a flexible sheet compatible for roll-to-roll processing thereof.

The light guide body plate may comprise any details, elements, parts, materials, and features discussed above in the first aspect. For example, the light guide body plate has a first main surface 711 and a substantially parallel second main surface 712 opposite to the first main surface and separated therefrom in a vertical direction by a thickness of the light guide body plate, and is made of a light guide material having a first refractive index.

Next, a plurality of elongated light channels 720 are formed in the light guide body, extending substantially parallel to each other and to the first and the second main surfaces of the light guide body. To form the light channels, first, elongated grooves 724 are formed, for example, by laser ablation or hot embossing, in the light guide body plate 710 on the second main surface 712 thereof as illustrated in drawing B. In the example illustrated in FIG. 7, two pluralities of grooves are formed, the grooves of the two pluralities being directed substantially perpendicularly to each other.

In the example of FIG. 7, the grooves are formed to have a triangular cross-section. This is only one example and any other appropriate shape is also possible.

For each light channel 720, there are two grooves 724 confining the light channel in a horizontal transverse direction therebetween. The grooves are formed to have a height less than the thickness of the light guide body plate so that the light guide body plate forms a continuous structure.

Next, the grooves are filled, for example, applying a liquid, curable, optically clear filling agent into the grooves and curing it thereafter, for example, by UV light or heat. Thereby, confining stripes 730 are formed of a solid confining material, as illustrated in drawing C of FIG. 7. The confining material is selected to have a second refractive index lower than the first refractive index by a refractive index difference which enables total internal reflection at interfaces 723 between the light channels 720 and the confining stripes 730.

Finally, an out-coupling arrangement 740 is formed, by any appropriate method, on the first main surface 711 of the light guide body plate, as illustrated in drawing D. As discussed above, forming the out-coupling arrangement may be comprises forming various types of optical micro features, possibly comprising lines oriented perpendicularly to the longitudinal direction(s) of the light channels.

In other embodiments, the out-coupling arrangement may be formed before the grooves. On the other hand, it is also possible to form the out-coupling arrangement and the grooves on the same side or on the same main surface of the light guide body plate.

The light guide 700 manufactured by the method may be, for example, in accordance with the light guide of FIG. 3. A corresponding method can be carried out also to manufacture a light guide having only one plurality of light channels, such as the light guide of FIG. 1. Then, the filling agent and the confining material formed thereof does not need to be optically clear.

Further, a corresponding method may be carried out to manufacture the two light guide body plates of a two-body light guide such as that of FIG. 2.

Any of the methods discussed above may further comprise providing a liquid crystal layer, and assembling the light guide and the liquid crystal layer into a display assembly where the light guide is arranged for illuminating the liquid crystal layer.

It is to be noted that the present invention is not limited to the examples above. Instead, the embodiments of the present invention can freely vary within the scope of the claims.

The invention claimed is:

1. A light guide comprising a light guide body plate having a first main surface and a substantially parallel second main surface opposite to the first main surface and separated therefrom in a vertical direction by a thickness of the light guide body plate, the light guide body plate being made of a light guide material having a first refractive index, and comprising a plurality of elongated light channels extending substantially parallel to each other and to the first and the second main surfaces; the light guide comprising an out-coupling arrangement for coupling light propagating in the light channels out of the light guide body plate through the first and/or the second main surface;

wherein, in a horizontal transverse direction, each light channel is confined between two confining stripes formed of a solid confining material having a second refractive index lower than the first refractive index by a refractive index difference to enable total internal reflection at interfaces between the light channel and the confining stripes, confining stripes between two adjacent light channels having a height less than the thickness of the light guide body plate so that the light guide body plate forms a continuous structure;

wherein the light guide body plate comprises a first and a second plurality of light channels in accordance with the plurality of light channels defined above, the light channels of the first and the second pluralities of light channels being directed at an angle with relation to, and crossing with each other; the confining stripes having a maximum width in the horizontal transverse direction; the confining material being selected to produce, for the maximum width of the confining stripes, optically clear confining stripes with transmittance of at least 80% and a haze value of 30% at maximum; and wherein the refractive index difference is less than or equal to 0.2, and the height of the confining stripes between two adjacent light channels covers 50 to 90% of the thickness of the light guide body plate.

2. The light guide as defined in claim 1, wherein the out-coupling arrangement comprises optical micro features positioned horizontally aligned with a light channel, the optical micro features comprising lines oriented perpendicular to a longitudinal direction of the light channel.

3. The light guide as defined in claim 1, wherein the confining stripes have a substantially triangular cross-section.

4. A liquid crystal display assembly comprising a liquid crystal layer and a light guide as defined in claim 1 arranged for illuminating the liquid crystal layer.

5. A method for manufacturing a light guide, comprising:
providing a light guide body plate having a first main surface and a substantially parallel second main surface opposite to the first main surface and separated therefrom in a vertical direction by a thickness of the light guide body plate, the light guide body plate being made of a light guide material having a first refractive index;
forming in the light guide body plate a plurality of elongated light channels extending substantially parallel to each other and to the first and the second main surfaces; and
forming an out-coupling arrangement for coupling light propagating in the light channels out of the light guide body plate through the first and/or the second main surface;
wherein forming the plurality of elongated light channels comprises:
forming a plurality of grooves in the light guide body plate, each light channel being confined, in a horizontal transverse direction, between two grooves, grooves between two adjacent light channels having a height less than the thickness of the light guide body plate so that the light guide body plate forms a continuous structure;
and
filling the grooves so as to form confining stripes formed of a solid confining material having a second refractive index lower than the first refractive index by a refractive index difference to enable total internal reflection at interfaces between the light channel and the confining stripes;
wherein the method comprises forming in the light guide body plate a first and a second plurality of light channels in accordance with forming the plurality of light channels defined above, the light channels of the first and the second pluralities of light channels being directed at an angle with relation to, and crossing with each other; the confining stripes being formed so as to have a maximum width in the horizontal transverse direction; the confining material being selected to produce, for the maximum width of the confining stripes, optically clear confining stripes with transmittance of at least 80% and a haze value of 30% at maximum;
and
wherein the refractive index difference is less than or equal to 0.2, and the grooves are formed so as to make the height of the confining stripes between two adjacent light channels cover 50 to 90% of the thickness of the light guide body plate.

6. The method as defined in claim 5, wherein filling the grooves comprises applying a filling agent in a liquid form into the grooves, and curing the filling agent in the grooves.

7. The method as defined in claim 5, wherein forming the out-coupling arrangement comprises forming optical micro features positioned horizontally aligned with a light channel, the optical micro features comprising lines oriented perpendicular to a longitudinal direction of the light channel.

8. The method as defined in claim 5, wherein the grooves are formed so as to have a substantially triangular cross-section.

9. The method for manufacturing a liquid crystal display assembly comprising manufacturing a light guide in accordance with the method of claim 5, providing a liquid crystal layer; and assembling the light guide and the liquid crystal layer into a display assembly where the light guide is arranged for illuminating the liquid crystal layer.

10. The light guide as defined in claim 1, wherein the refractive index difference is less than or equal to 0.1.

11. The method as defined in claim 5, wherein the refractive index difference is less than or equal to 0.1.

\* \* \* \* \*